Figure 1:
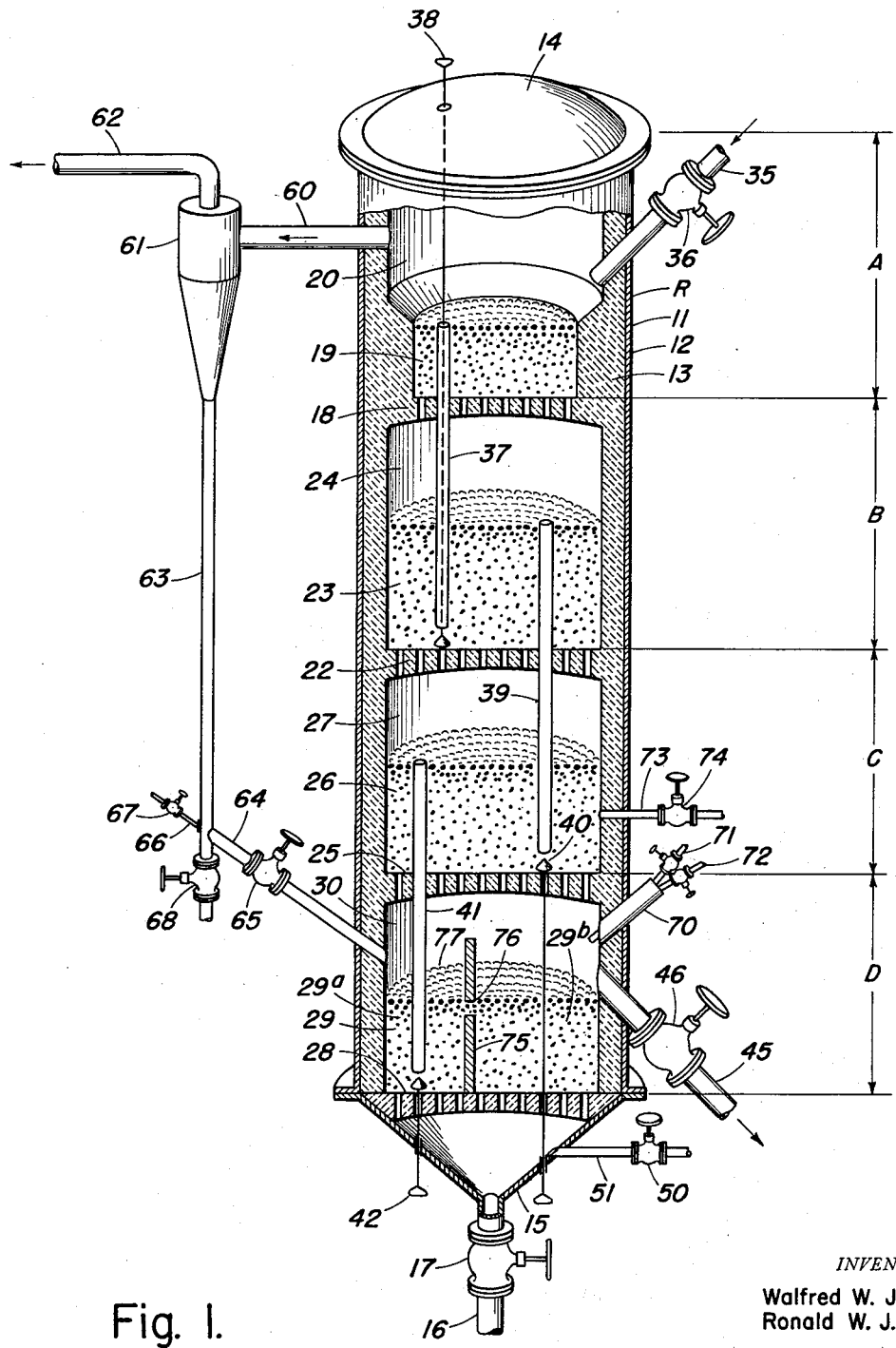

June 12, 1956

W. W. JUKKOLA ET AL 2,750,258

PROCESS FOR CALCINING FINELY-DIVIDED ALUMINA HYDRATE

Filed Feb. 17, 1954

2 Sheets-Sheet 1

INVENTORS
Walfred W. Jukkola
Ronald W. J. Lewis

BY William J. Fox

ATTORNEY

June 12, 1956 W. W. JUKKOLA ET AL 2,750,258
PROCESS FOR CALCINING FINELY-DIVIDED ALUMINA HYDRATE
Filed Feb. 17, 1954 2 Sheets-Sheet 2

INVENTORS
Walfred W. Jukkola
Ronald W. J. Lewis

BY William J. Fox
ATTORNEY

United States Patent Office 2,750,258
Patented June 12, 1956

2,750,258

PROCESS FOR CALCINING FINELY-DIVIDED ALUMINA HYDRATE

Walfred W. Jukkola, Westport, Conn., and Ronald W. J. Lewis, Dorval, Quebec, Canada; said Jukkola assignor to Dorr-Oliver Incorporated, a corporation of Delaware, and said Lewis assignor to Aluminum Company of Canada, Limited, Montreal, Quebec, Canada Application February 17, 1954, Serial No. 410,848

3 Claims. (Cl. 23—142)

This invention relates generally to the calcination of hydrated alumina and more particularly to improved ways and means for the calcination of finely-divided alumina in accordance with the fluidized solids technique.

In general, in the fluidized technique for treating solids, a bed of subdivided solid particles is maintained as a dense non-stratifying homogeneous suspension behaving like a turbulent liquid and exhibiting a fluid level. This is accomplished by passing through the bed an uprising stream of gas at a velocity sufficient to considerably expand the depth of the bed as well as to maintain its particles in turbulent suspension in the uprising gas stream. Under such conditions, the bed is called a fluidized bed. The fluid level of this fluidized bed is usually maintained by the use of a spill-pipe or overflow arrangement so that as more solid particles are introduced into the bed, the resulting increased depth causes the particles to overflow down through the spill-pipe just as a fluid does.

Fluid operation results in excellent diffusion of heat through the fluidized bed and is, therefore, particularly well adapted for treating solids at elevated temperatures. Typical processes are exothermic reactions, i. e. sulfide roasting, where the heat is supplied by the reaction itself and the endothermic calcination of limestone wherein heat is supplied by burning fuel directly in the fluidized bed or by supplying hot gases and/or entrained solids to the bed. In all cases the limitation must be observed that the bed temperature does not exceed the fusion point of the bed solids.

Proper fluidization depends upon a maintained gas velocity through the bed sufficient to turbulently mobilize the bed solids to render them as a dense homogeneous suspension of solids. This gas velocity must also be kept below a certain maximum in order to prevent the bed solids from being entrained and carried away in the existing gas stream. In other words, the fluidizing gas velocities are sufficient to fluidize the bed solids as a dense turbulent suspension and to carry a portion of the solids from the bed by gas entrainment. Fluidizing gas velocity is measured as that linear velocity which the quantity of gas passing through the bed would exhibit in passing through the reactor when the reactor is devoid of solids, this linear velocity is called "space rate."

In a reactor having a plurality of zones, several beds of solids are simultaneously maintained in such a fluidized state. Each fluidized bed is usually a separate distinct treatment stage. The treated solid particles from the first bed are discharged or allowed to overflow to a second bed for further treatment then discharge to the next bed for even further treatment, etc. This process continues until the particles have passed through all of the fluidized beds after which they are discharged from the reactor. This type of operation is usually referred to as multi-stage.

It has been proposed to calcine hydrated alumina in accordance with the multi-stage fluidized technique. Such processes usually make use of a plurality of superposed beds of solids within a single enclosed reaction chamber. Incoming feed is preheated in one or more superjacent fluidized beds then calcined in a separate subjacent bed where fuel is combusted to supply heat to the bed, finally the calcined solids are discharged to a further subjacent fluidized bed where they are cooled by an uprising gas stream prior to discharge from the reactor.

The aim of such processes is to yield a calcine amenable to further treatment in the production of metallic aluminum. This means that the calcine must be both anhydrous and non-hygroscopic.

During calcination of aluminum hydrate for this purpose, two distinct changes occur in the material being treated. The first is a simple dehydration step where water is given up, as shown by the equation:

$$Al_2O_3 \cdot XH_2O + heat \rightarrow Al_2O_3 + XH_2O(g)$$

This reaction proceeds readily at temperatures lower than 1000° F., but the resulting $Al_2O_3$ is not an acceptable product because it is hygroscopic and readily absorbs moisture. To produce an acceptable product, it is necessary to cause the second distinct change of property, i. e. heat stabilization, to produce the required non-hygroscopic form. To induce this change, it is necessary to carry out calcination at temperatures in the region of 1650° F.– 1800° F., where some crystal transformation apparently occurs, and the material is rendered non-hygroscopic.

It was originally believed that all of the alumina must be subjected to this high temperature calcination in order to yield an acceptably non-hygroscopic product, however, we have discovered that this is not true and this discovery constitutes the basis for this invention as will be hereinafter pointed out.

Such multi-stage processes are capable of yielding a commercially acceptable non-hygroscopic product, however, because of high dust losses due to dust entrainment in the reactor exit gases they are not commercially attractive.

The dust which is carried out of the reactor with the exit gases is not an acceptable commercial product because it contains a high percentage of uncalcined and/or partially solids stripped from the fluidized beds of the reactor. As a result of this, it is common to lose as much as 20% to 25% of the total product by entrainment in the reactor exit gases.

It has been proposed to overcome this dust loss by separating the dust from the exit gases and returning it to the reactor either as new feed or mixed with the regular feed supply. Such a practice will serve the purpose of forcing the material to eventually pass through the reactor to finally discharge as fully calcined product. However, this practice also results in building up a high circulating dust load between the calcining bed and the upper preheating bed which in turn causes the temperature of the upper bed to increase with the result that the temperature of the exit gases increases and heat is lost from the system in the form of excessively heated exit gases. Since these hotter gases extract an increased quantity of heat from the reactor, the inevitable result is the necessity for supplying additional fuel to the reactor in order to maintain proper calcining temperatures thus increasing operating costs.

The foregoing problem has been at least partially overcome by a proposal whereby the dust is separated from the gases and then returned to the solids cooling bed located below the high temperature calcining bed. In such a process it was discovered that the dust, upon discharge from the cooling bed with the other solids, was unexpectedly in a commercially acceptable non-hygroscopic form even though it had not all passed through the high temperature calcining bed.

Although this proposed process yields a commercially acceptable product, it is not commercially attractive in all cases because of the fact that it is limited to low capacity operations. This is so because, at high capacities, where the dust recycle load increases and solids detention time decreases, the dust fraction is not sufficiently converted to the non-hygroscopic form during passage through the cooling bed. As a result, the final calcine is not a commercially acceptable product.

It is therefore a principal object of this invention to provide ways and means whereby the above described multi-stage fluidized calcination of alumina (with return of dust to the cooling bed) may be carried out at high rates without sacrifice in either product quality or economy of operation.

This, and possibly other objects are attained by utilization of a multi-bed reactor having at least a solids calcining bed and a subjacent solids cooling bed both of which are fluidized by the successive passage therethrough of an uprising gas stream. The solids cooling bed is further divided into two adjacent and communicating sections so arranged that solids enter a first section of this bed then transfer to the second section from whence they are finally discharge as product. Hydrated alumina is supplied to the first bed for calcination, the major portion or coarse fraction of these solids are then transferred directly to the first section of the subjacent cooling bed, while the remaining fine solids or dust fraction is carried from the reactor entrained in the exit gases. This dust fraction is separated from the gas and is also returned to the first section of the cooling bed where it mixes with the hotter coarse fraction, the resulting mixture is then transferred to the cooling bed proper (second section) for further cooling and is then discharged as product.

In brief, our invention proposes to commingle the separated dust with the hot calcined solids transferred from the first bed in a confined section of the second bed then transfer the resulting mixture in the second bed proper for final cooling, and discharge the cooled mixture as product.

Advantageously, there will be utilized at least one bed superjacent to the calcining bed for preheating incoming solids thus providing greater fuel economy. The process is made continuous by continuous feed and discharge.

We have observed during low capacity operation that the dust fraction recycled to the cooling bed represents a relatively minor fraction say 20–25%, of the total solids in that bed and that, due to the low ore operation, this dust fraction has a relatively long contact time with the hotter solids descending from the superjacent calcining bed. Although this bed is maintained at a relatively low temperature in the range from 800° F. to 1000° F., nevertheless the thermal effect on the dust is such that the resulting mixture of dust and cooled solids is acceptably non-hygroscopic.

When, however, the capacity of the process is increased (within the same reactor) the dust carry over increases due to increased gas velocity. This means a greater dust fraction recycled to the cooling bed which, along with the decreased detention time in the bed, reduces the thermal effect within the bed to a point where the dust is not converted to the non-hygroscopic form and the resulting mixture of cooled dust and coarse solids is not commercially acceptable.

We have discovered that we can prevent this reduction in thermal effect on the dust fraction by the novel expedient of dividing the cooling bed into two side-by-side, or adjacent, sections to one of which is directly supplied both the recycled dust fraction and the solids overflowing from the calcining bed, then transferring the resulting mixture into the other section of the bed for final cooling and ultimate discharge.

By mixing the two solids fractions (recycled dust and coarser solids) in a concentrated area or section the temperature of the dust fraction is suddenly raised to a temperature considerably higher than both the incoming temperature of the dust and the temperature of the rest of the cooling bed. This operation apparently restores the thermal effect because, even with extremely short detention in this bed section, the finally cooled mixture is a commercially acceptable product.

We have used the term "thermal effect" in describing our process because we know of no accurate way to explain how the dust fraction can be converted to a non-hygroscopic form at temperatures in the region of 1000° F. to 1250° F. when all prior experience dictates that the conversion from hygroscopic alumina to non-hygroscopic alumina requires temperatures in the region of 1650° F. to 1800° F.

Briefly then, this invention revolves about the basic concept of combining the recycled dust fraction and the hotter coarse fraction and temporarily confining this mixture in a relatively small area within the cooling bed, and then transferring the mixture to the cooling bed proper for final cooling and discharge. By thus confining the two fractions in a relatively small area it is insured that the dust fraction will mix intimately with the hotter coarse fraction and so will be shock heated before final cooling.

In general we have found that optimum operation will be attained when the confined section of the second (cooling) bed is maintained at temperatures in the range from 1100° F. to 1600° F. while temperatures in the second bed proper may range considerably lower, say on the order of 700° F. to 900° F. This moderate temperature in the confined section, even at high through put rates, will contribute sufficient thermal effect to render the mixture of dust and solids as a commercially acceptable non-hygroscopic product.

The apparatus invention hereof, in its briefest form, embodies a conventional vertical multi-stage fluidized solids reactor in which the lowermost bed is a solids cooling bed while the next superjacent bed is the solids calcining bed; the cooling bed is divided into two portions the smaller of which receives solids discharged from the calcining bed as well as dust separated from the reactor exit gases; the baffle performing the division of the cooling bed is provided with an opening or other solids overflow edge to permit passage of solids from the smaller bed portion into the larger bed portion from whence they are discharged from the cooling bed.

This baffle may take any of several forms, such as a circular baffle defining a small circular portion within a larger annular portion. Or the baffle may take the simple form of a vertical baffle shown in the drawings. Also, the solids transfer may through a hole in the baffle or over the top of the baffle, depending upon the design used and whether the baffle divides the entire cooling zone including freeboard or just divides the lower portion containing the fluidized bed.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

In the drawings, Figure 1 shows a preferred four compartment reactor embodying this invention.

Figure 2:
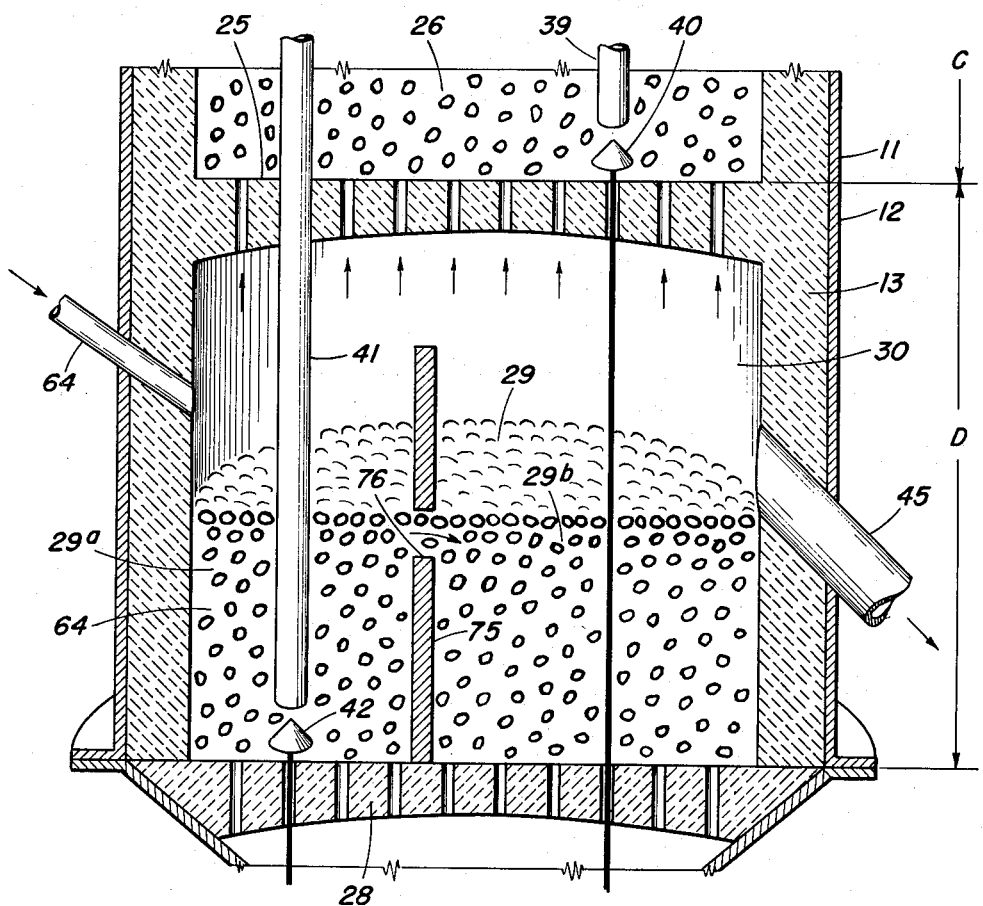

Figure 2 is a schematic cut-away view showing the critical features of this invention.

In Figure 1 there is shown a reactor, generally designated R, having a cylindrical section 11 with a steel outer wall 12 and lined with refractory material 13. The reactor has a top 14, and a coned bottom 15 which is equipped with a clean out conduit 16 valved as at 17.

The reactor is divided into 4 zones—A, B, C, and D, as indicated in the drawing. Zone A is defined by an apertured constriction plate 18 spaced below the top of the reactor and adapted to contain thereon a bed, 19, of solids, above which is a freeboard space 20. Zone B is similarly defined by an apertured constriction plate 22 disposed below constriction plate 18. Constriction plate 22 is adapted to support thereon a bed of solids 23 over which is a freeboard space 24. Zone C is similarly defined by apertured constriction plate 25 which is adapted to support a bed of solids 26 above which is a freeboard space 27. Zone D is defined similarly by apertured constriction plate 28 adapted to support bed 29 over which is freeboard space 30.

Solids to be treated are admitted into the reactor via conduit 35 which is valved as at 36. These incoming solids enter bed 19 from whence they overflow through conduit 37 into bed 23. Conduit 37 is equipped with a cone valve assembly 38 which prevents the upward passage of the gas through the conduit in order to promote proper solids flow through the conduit. Solids from bed 23 overflow into bed 26 through conduit 39 which is equipped with a cone valve 40, solids from bed 26 overflow via conduit 41 into bed 29. Conduit 41 is equipped with a cone valve assembly 42. Each bed of the reactor is equipped with a clean out valve, but these are omitted from the drawings to avoid unnecessarily complicating them. Solids finally discharging from the reactor do so via conduit 45 which is valved as at 46.

Fluidizing gas is admitted to the reactor by way of coned bottom 15 via conduit 51 which is valved as at 50. This gas passes successively upwardly through the four beds of the reactor and eventually exits from the reactor via conduit 60. Since this exiting stream of gas contains entrained dust it is passed directly into dust collection station 61 where the dust and gas are separated. The dust-free gas is discharged via conduit 62 to further cleaning, heat exchange, to process, etc. The separated dust is discharged via tailpipe 63 into conduit 64 thence into freeboard zone 30 from whence it falls into bed 29. Regulation of the flow of solids through conduit 64 is accomplished by means of valve 65 in conjunction with air ejector 66 and air regulating valve 67. Valve 68 is provided for cleaning out tailpipe 63 or bypassing part of the dust for test purposes, or other reasons, if desired.

In starting up the reactor, it is necessary to add heat in order to reach reaction and fuel combustion temperatures. This initial supply of heat is furnished by the use of torch 70 which has leading into it a valved fuel supply line 72 and a valved air supply line 71. After the reactor has attained operating temperatures and bed 26 has reached a sufficiently high temperature so that it will support the combustion of fuel, torch 70 is cut off and heat is thereafter supplied by admitting fuel via conduit 73 and valve 74 in a regulated quantity and combusting that fuel directly within bed 26. Normally several fuel injection ports are provided in the calcining bed. These cannot be seen in the drawings but will generally be located on the circumference of the bed.

The critical features of this invention are shown in the cooling bed 29 in which there is a transversely extending partial baffle 75. This baffle does not completely isolate the two bed sections, but allows them to communicate through a solids-transfer opening 76 below the bed level 77 of the fluidized bed 29. It will be noted that the solids discharging from bed 26 via conduit 41 go into the smaller section of the bed, 29ᵃ, defined between the wall of the reactor and baffle 75. Into this same section of the bed the dust discharged from cyclone 61 is supplied. Solids entering bed 29 are commingled in bed section 29ᵃ and, due to the concentration there of high temperature solids from bed 26 the dust fraction is subjected to intense heat action before it flows through opening 76 into bed section 29ᵇ which is the final cooling section of the bed.

In Figure 2 there is shown a cut away partial view of the reactor of Figure 1. Identical numerals are used in Figure 2 to designate identical parts shown in Figure 1. Figure 2 shows all of zone D and the bottom portion of zone C so that the operation of the final cooling bed with its partial baffle can be better visualized.

In Figure 2 there is shown a part of the cylindrical section 11 with its steel shell 12 and refractory lining 13. There is also shown constriction plate 25 and a portion of calcining bed 26 into which can be seen entering conduit 39 with its cone valve assembly 40. Leaving bed 26 is conduit 41 and at the bottom thereof can be seen a portion of its cone valve assembly 42. The bottom of zone D is defined as in Figure 1 by apertured constriction plate 28 which supports thereon a bed of solids 29.

Bed 29 is divided by partial baffle 75 into two sections designated 29ᵃ and 29ᵇ. Section 29ᵇ is the final cooling section and is the biggest section of the bed wherein the solids are finally subjected for a greater period of time to the cooling action of the gases uprising through the apertures of plate 28. Section 29ᵃ can be termed a preliminary cooling, final-calcining section wherein the dust entering through conduit 64 is subjected to a final thermal treatment due to the relatively high temperature of that section of the bed.

It will be noted that baffle 75 is not disposed in the exact center of bed 29 but is so located that the bed is divided into unequal zones. This proportioning of the bed sections is critical and must be so arranged in correlation with the temperature of the solids entering section 29ᵃ that the temperature of that section is significantly higher than the temperature in section 29ᵇ. This precaution will insure that there is a significant temperature differential between confined bed area and the bed proper thus insuring that the dust entering from conduit 64 will be given the opportunity of final thermal treatment in contact with the solids entering from bed 26.

It should be pointed out that in no case can the temperature of section 29ᵃ be as high as that of bed 26 which is the primary calcining bed. However, the temperature of bed 29ᵃ will be sufficiently high to carry out at high capacity, the calcination of the entering dust in order to yield a non-hygroscopic form of solids. Since it has been previously demonstrated with prior processes that at low feed rates the dust can be converted into an acceptable product by recycling it to the cooling bed without a baffle, our process will enable one to increase the capacity of the normal solids calciner by providing a high temperature zone and thus substituting that high temperature zone for the longer detention of the low rate reactors.

*Example I*

For calcining finely divided alumina try-hydrate ($Al_2O_3H_2O$) containing 12% moisture the following conditions will prevail for optimum operation in accordance with this invention.

After a four compartment reactor is brought to operating temperature the upper bed will be maintained at a temperature near 420° F. while the second preheating bed will be maintained near 800° F., the calcining bed be maintained at approximately 1800° F. at the bottom, the cooling bed will be divided into two sections, the small section of which occupies ⅛ of the total bed area and the remaining or final cooling section of the bed occupies ⅝ of the total area. Feed is supplied to the upper bed at the rate of 25 lbs. per minute and fluidized gas is supplied to the reactor at 16 lbs. per minute or at a flow rate of 210 standard cubic feet per minute. Under these conditions the dust fraction amounts to 4 lbs. per minute and this dust fraction is supplied to the smaller section of the cooling bed. The coarser material discharging from the calcining bed is also supplied to the smaller section of the cooling bed. The result of mixing these two fractions in the small section of the cooling bed is that the temperature in the small section is maintained near 1300° F. After mixing in this section of the bed the mixture is transferred to the larger section of the cooling bed (the cooling bed proper), which due to the action of the uprising gases is maintained at a temperature near 825° F. The composite product will be sufficiently calcined so that it is a commercially acceptable product.

We claim:

1. In the continuous process for calcining finely-divided alumina hydrate solids to yield non-hygroscopic anhydrous alumina, which comprises the steps of establishing and maintaining in an enclosed chamber two superimposed beds of finely-divided alumina solids including an upper calcining bed maintained at temperatures sufficient to convert alumina hydrate into substantially non-hygroscopic anhydrous alumina as well as a directly subjacent solids cooling bed maintained at temperatures lower than those required for yielding non-hygroscopic alumina in the calcining bed, successively passing a stream of gas upwardly through the beds at velocities sufficient to both fluidize the bed solids as turbulence suspension and to entrain a portion of such solids, supplying finely-divided alumina hydrate solids to the calcining bed, calcining a portion of such solids in the latter bed to yield substantially non-hygroscopic alumina while entraining another portion of the solids in the uprising gas stream before full conversion to the non-hygroscopic form is achieved, transferring calcined non-hygroscopic solids from the calcining bed to the subjacent cooling bed, discharging gas with entrained incompletely-calcined dust from the calcining bed and from the chamber, intercepting said gas and separating dust therefrom, supplying such separated dust directly to the solids cooling bed to commingle therein with fully calcined solids, cooling the resultant mixture in the cooling bed by the upward passage of gases therethrough, and discharging the cooled mixed solids from the chamber; the improvement which consists of maintaining in the cooling bed two separate but adjacently communicating zones the first of which is maintained at a temperature lower than that of the calcining zone and the second of which is maintained at a temperature lower than that of said first zone, commingling said separated dust with said calcined solids in said first zone, and transferring the resulting mixture to said second zone for final cooling prior to discharge from the chamber.

2. Process according to claim 1 in which the calcining bed is maintained at temperatures in the range from substantially 1600° F. to substantially 1800° F. while the first of the separate zones in the cooling bed is maintained at temperatures in the range from substantially 1100° F. to substantially 1600° F. and the temperatures in the second zone of the cooling bed is maintained in the range from substantially 700° F. to substantially 900° F.

3. Process according to claim 1 with the addition of preheating the finely-divided alumina hydrate solids by passing them through at least one additional fluidized solids bed before supplying them to the calcining bed, said additional bed being heated and fluidized by the upward passage therethrough of gases discharged from the calcined bed prior to the separation of entrained solids from said gases.

References Cited in the file of this patent

UNITED STATES PATENTS

| 2,094,275 | Mitchell | Sept. 28, 1937 |
| 2,548,642 | White | Apr. 10, 1951 |
| 2,561,396 | Matheson | July 24, 1951 |
| 2,625,464 | Roberts et al. | Jan. 13, 1953 |

OTHER REFERENCES

Mellor: "Comprehensive Treatise on Inorganic and Physical Chemistry," published by Longmans, Green and Co., New York, 1924, vol. 5, page 266.